US012782770B2

(12) United States Patent
Sagardoyburu

(10) Patent No.: US 12,782,770 B2
(45) Date of Patent: Nov. 3, 2026

(54) METHOD FOR MANUFACTURING SUCH A DISPLAY SCREEN

(71) Applicant: The Swatch Group Research and Development Ltd, Marin (CH)

(72) Inventor: Michel Sagardoyburu, Neuchâtel (CH)

(73) Assignee: The Swatch Group Research and Development Ltd, Marin (CH)

(*) Notice: Subject to any disclaimer, the term of this patent is extended or adjusted under 35 U.S.C. 154(b) by 175 days.

(21) Appl. No.: 18/934,444

(22) Filed: Nov. 1, 2024

(65) Prior Publication Data

US 2025/0199356 A1 Jun. 19, 2025

(30) Foreign Application Priority Data

Dec. 14, 2023 (EP) .................................... 23216727

(51) Int. Cl.
*G02F 1/00* (2006.01)
*C09J 5/02* (2006.01)
*G02F 1/1335* (2006.01)

(52) U.S. Cl.
CPC .......... *G02F 1/133533* (2013.01); *C09J 5/02* (2013.01); *C09J 2203/326* (2013.01); *G02F 2202/04* (2013.01); *G02F 2202/28* (2013.01)

(58) Field of Classification Search
CPC ........... G02F 1/133533; G02F 2202/04; G02F 2202/28; G02F 1/133528; G02F 1/1333; C09J 5/02; C09J 2203/326
USPC ............................................................. 8/506
See application file for complete search history.

(56) References Cited

U.S. PATENT DOCUMENTS

2003/0001987 A1* 1/2003 Trapani ............. G02F 1/133528
349/96
2020/0257164 A1* 8/2020 Yan ........................ B05D 3/067

FOREIGN PATENT DOCUMENTS

| | | | | | |
|---|---|---|---|---|---|
| CN | 110275362 | | * | 9/2019 | .......... G02F 1/1333 |
| JP | S53-117443 | A | | 10/1978 | |
| JP | H05-241022 | A | | 9/1993 | |
| JP | 3052812 | U | | 10/1998 | |
| JP | 2009-031474 | A | | 2/2009 | |
| KR | 10-2004-0099815 | A | | 12/2004 | |
| KR | 20160088751 | A | * | 7/2016 | .......... F02F 1/33528 |
| KR | 10-2017-010594 | A | | 9/2017 | |

* cited by examiner

*Primary Examiner* — Eisa B Elhilo
(74) *Attorney, Agent, or Firm* — Sughrue Mion, PLLC

(57) ABSTRACT

A method for manufacturing a coloured electronic display screen (10) including an active cell (11) and at least one polariser film (114) having an optical layer (115) and a tinted adhesive layer (116) via which the polariser film (114) is bonded to the active cell (11).

3 Claims, 1 Drawing Sheet

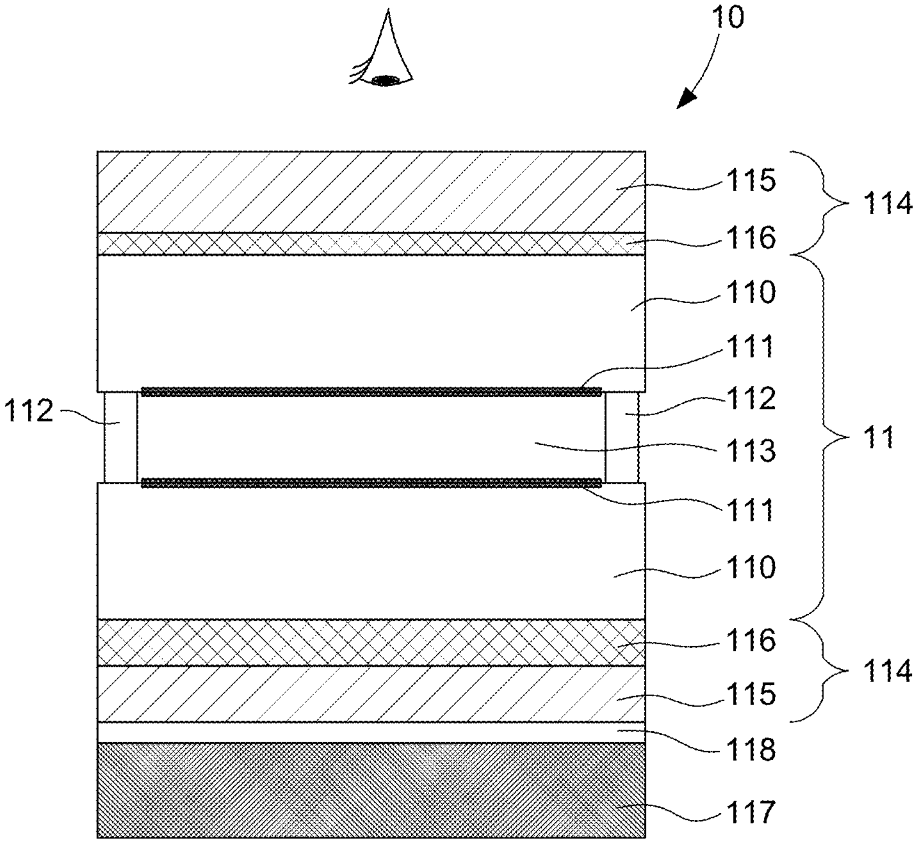
10
115
116
114
110
111
112
112
113
11
111
110
116
114
115
118
117

METHOD FOR MANUFACTURING SUCH A DISPLAY SCREEN

CROSS REFERENCE TO RELATED APPLICATIONS

This application claims priority to European Patent Application No. 23216727.0 filed Dec. 14, 2023, the entire contents of which are incorporated herein by reference.

TECHNICAL FIELD OF THE INVENTION

The invention relates to the field of display screens, in particular electronic display screens. More specifically, the invention relates to a method for manufacturing such a display screen.

TECHNOLOGICAL BACKGROUND

Many electronic display screen technologies exist, among which liquid crystal displays, which are very commonly used in all types of applications.

Liquid crystal display screens can be raster-scan displays or segmented displays and comprise a liquid crystal cell on either side of which optical films, in particular polariser films and a colour film, are arranged in order to impart a given colour to the display screen.

Introducing the colour filter into the cell has a number of drawbacks.

More specifically, since it can be up to 100 μm thick, the colour filter can be particularly burdensome in certain fields of application of liquid crystal display screens where the aim is to miniaturise component dimensions as much as possible, for example in the watchmaking industry.

Moreover, the choice of colours for the colour filter is limited, which restricts aesthetic possibilities for the final product, and the manufacture of these colour filters is not suitable for small production runs, which has a significant impact on production costs depending on the quantity of colour filters to be considered. Such small production runs are required, for example, when liquid crystal display screens are small, for example in the watchmaking industry.

SUMMARY OF THE INVENTION

The invention overcomes the aforementioned drawbacks and, to this end, relates to a method for manufacturing a coloured electronic display screen as previously described, which method comprises:

- a step of obtaining a polariser film comprising an optical layer on which an adhesive layer extends,
- a step of dyeing the adhesive layer, then
- a step of bonding the polariser film to the active cell by means of said adhesive layer.

In particular implementations, the dyeing step consists of immersing the polariser film in a dye bath so that the contents of the bath diffuse into the adhesive layer.

In particular implementations, the dyeing step successively comprises an operation of dip-coating the polariser film, an operation of rinsing the polariser film, an operation of drying the polariser film and an operation of cutting the polariser film so that it has given dimensions.

In particular implementations, the dip-coating operation is carried out for 10 to 60 seconds.

In particular implementations, the drying operation is carried out by forced air or by firing.

BRIEF DESCRIPTION OF THE FIGURES

Other features and advantages of the invention will become apparent upon reading the following detailed description, which is given by way of example and is by no means limiting, with reference to the FIGURE, which diagrammatically shows a cross-sectional view of a coloured electronic display screen according to a preferred example of the present invention.

It should be noted that the FIGURE is not drawn to scale for reasons of clarity.

DETAILED DESCRIPTION OF THE INVENTION

The FIGURE shows an example application of a coloured electronic display screen 10 according to the present invention, in which the electronic display screen 10 is formed by a liquid crystal display (LCD). It should be noted that the invention can be applied to any type of electronic display screen, for example to display screens comprising at least one organic light-emitting diode (OLED).

The aim of the invention is to give the display screen a given monochrome colouring that is stable over time.

The electronic display screen 10 comprises an active cell 11 formed, in the example embodiment shown in the FIGURE, by a liquid crystal cell for a segmented display. This liquid crystal cell is defined, in a manner known per se to a person skilled in the art, between two substrates 110, made for example of glass or plastics material, to each of which a transparent electrode 111 is fastened, the two electrodes 111 being separated by a sealing frame 112 in which liquid crystals 113 are confined.

It should be noted that the invention can also be applied to liquid crystal display screens intended to display a raster image.

The electronic display screen 10 comprises at least one polariser film 114 comprising an optical layer 115 over which extends a tinted adhesive layer 116. The polariser film 114 is bonded to the active cell 11 via the adhesive layer 116. The adhesive layer 116 is also known by the acronym "OCA" for "optically clear adhesives" and is, for example, made with an acrylic adhesive.

In particular, in the example embodiment shown in the FIGURE, a polariser film 114 is bonded to each substrate 110 of the active cell 11. The two adhesive layers 116 attaching the polariser films 114 can be tinted, in order to increase the intensity of the colour or to be closer to the perceived target colour.

In this text, the relative terms "front" and "rear" refer respectively to the position of an element of the electronic display screen 10 relative to a user when the latter is viewing the display, as illustrated diagrammatically in the FIGURE.

The electronic display screen 10 thus comprises a front polariser film 114 and a rear polariser film 114 respectively attached by a front adhesive layer 116 and by a rear adhesive layer 116. The rear adhesive layer 116 can be configured so as to have a light scattering capability.

As can be seen in the FIGURE, the electronic display screen 10 further includes a back layer 117, for example black in colour, bonded to the rear polariser film 114 by means of a back adhesive layer 118.

It goes without saying that all of the adhesive layers of the present invention are transparent or at least translucent.

The coloured electronic display screen 10 is manufactured using a method comprising a step of obtaining a polariser film 114 on which an adhesive layer 116 extends, a step of dying the adhesive layer 116, and then a step of bonding the polariser film 114 to the active cell 11 via said adhesive layer 116. These steps can be carried out for a plurality of polariser films 114 of the same electronic display screen 10.

The step of dying the adhesive layer 116 can consist of immersing the polariser film 114 on which the adhesive layer 116 is deposited in a dye bath, so that the contents of the bath diffuse into the adhesive layer 116. The bath can be composed of an aqueous solution, a solvent and acrylic pigments. Typically speaking, the bath can be composed of a composition suitable for dying plastics materials, within the reach of a person skilled in the art. Advantageously, following the dyeing step, the adhesive layer 116 retains its adhesive properties. Moreover, the dyeing step has the advantage that it does not affect the thickness of the polariser film 114.

Moreover, the dyeing step can, more specifically, successively comprise an operation of dip-coating the polariser film 114, an operation of rinsing the polariser film 114, an operation of drying the polariser film 114 and an operation of cutting the polariser film 114, so that the polariser film 114 has a given shape and dimensions.

For example, the dip-coating operation is carried out for 10 to 60 seconds, preferably for between 30 and 45 seconds. It should be noted that the intensity of the colour of the polariser film 114 is proportional to the duration of the dip-coating operation. This dip-coating operation can be carried out cold, i.e. in a bath at ambient temperature, or hot, i.e. in a bath with a temperature above 50 degrees Celsius. Carrying out the dip-coating operation hot advantageously allows the colour to be distributed more evenly over the polariser film 114 and more quickly.

Moreover, the drying operation can be carried out using forced air or by baking in an oven, for example at 70 degrees Celsius for 5 minutes.

More generally, it should be noted that the implementations and embodiments considered above have been described by way of non-limiting examples, and that other alternatives are thus possible.

Advantageously, the present invention does not increase the thickness of the electronic display screen 10, as it eliminates the need for an additional colour film. The present invention also allows the colour of the electronic display screen 10 to be finely controlled, since controlling the composition of the bath, the dip-coating time and the temperature of the bath during the dip-coating operation, or even the dyeing combination of at least two polariser films, is all that is required in order to obtain a desired colour.

The invention claimed is:

1. A method for manufacturing a coloured electronic display screen, comprising the following steps:

obtaining a polariser film comprising an optical layer on which an adhesive layer extends;

dyeing the adhesive layer; and bonding an polariser film to the active cell by means of said adhesive layer, wherein the dyeing step includes immersing the polariser film in a dye bath so that the contents of the bath diffuse into the adhesive layer, the dyeing step successively comprising an operation of dip-coating the polariser film, an operation of rinsing the polariser film, an operation of drying the polariser film and an operation of cutting the polariser film so that it has given dimensions.

2. The manufacturing method according to claim 1, wherein the dip-coating operation is carried out for 10 to 60 seconds.

3. The manufacturing method according to claim 1, wherein the drying operation is implemented by forced air or by baking.

* * * * *